Figure 1:
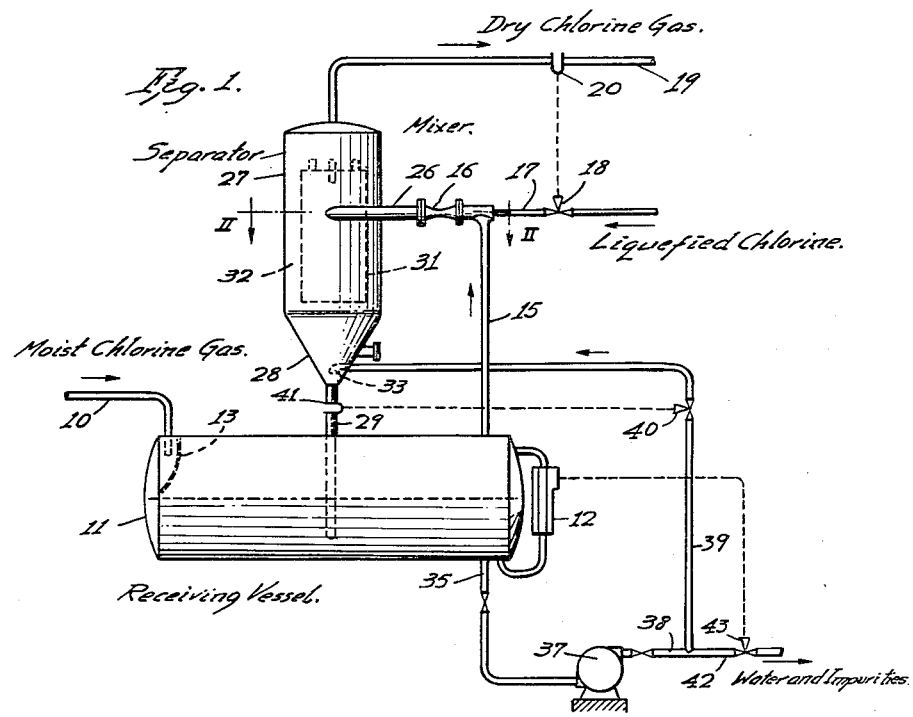

March 12, 1957 — A. K. REDCAY — 2,785,055
PROCESS FOR DRYING AND PURIFYING CHLORINE GAS
Filed April 4, 1951

INVENTOR.
Aaron K. Redcay.
BY
his ATTORNEY:

United States Patent Office 2,785,055
Patented Mar. 12, 1957

2,785,055

PROCESS FOR DRYING AND PURIFYING CHLORINE GAS

Aaron K. Redcay, Mount Lebanon, Pa., assignor to Gulf Oil Corporation, Pittsburgh, Pa., a corporation of Pennsylvania Application April 4, 1951, Serial No. 219,261

4 Claims. (Cl. 23—219)

This invention relates to a process for drying and purifying chlorine gas.

Chlorine is normally stored in liquid form in metal containers. It may be transported in these containers in liquid form, or by pipeline in gaseous form. In order to avoid corrosion of the containers or pipeline and to have a chlorine adapted for a variety of uses, it is important that the chlorine should be substantially free from moisture and organic impurities. The conventional processes for drying and purifying chlorine gas involve separate steps of drying and purifying. Thus, a well-known process for removing moisture from chlorine gas comprises passing the moist gas through strong sulfuric acid. Various methods for removing organic impurities have been proposed. One comprises passing the dry but impure gas through a scrubbing tower provided with a refrigerating coil to condense a portion of the gas to liquid chlorine which is effective to scrub out the impurities.

None of the foregoing processes has been entirely satisfactory. To provide a means of both drying and purifying the chlorine gas in a single process, it has been proposed to introduce the wet chlorine gas as it comes from the electrolytic cells to the action of a spray of liquid chlorine introduced into the upper portion of a contacting tower. In this process the wet chlorine gas is introduced into the bottom of the tower and comes initially into contact with cold gas formed from the liquid chlorine, which accomplishes cooling and the conversion of some of the water to ice or to chlorine hydrate. The gas, in continuing its flow up the tower, is said eventually to contact liquid chlorine, which contact is designed, in combination with the absorptive effect of the chlorine hydrate formed in the tower, to remove organic impurities from the gas. This process, while representing an improvement in certain respects over prior methods, has the disadvantage that the contact of the wet gas with the liquid chlorine is imperfect and adequate drying and purification of the gas are not accomplished unless the treating tower is of such length as to require a relatively large initial investment.

The process of the present invention utilizes liquid chlorine for the treatment of wet impure chlorine gas, but is characterized by important advantages over the process just described, resulting from the fact that uniform and intimate contact of the wet gas with the liquid chlorine is assured and the need for large equipment is obviated. Thus, an advantage of the present process is that it can be carried out in relatively inexpensive equipment and yields a final gas of uniform dryness and purity.

In accordance with the invention, chlorine gas from the electrolytic cells, preferably after a treatment to remove entrained water as described below, is continuously introduced into a mixing zone wherein it is rapidly mixed with liquid chlorine under such conditions that the liquid chlorine is largely retained in liquid phase. This mixing step is effected so that a substantially homogeneuos liquid-gas mixture is obtained. As a result, the whole body of gas is brought into contact with the liquid chlorine. Thereafter, the mixture is expanded quickly in a zone of reduced pressure, whereby the temperature of the components of the mixture is reduced below −20° F. and the mixture is immediately introduced into an enlarged separating zone. During the expansion and after the entrance of the mixture into the separating zone, the moisture present is caused to condense into ice and to combine with chlorine to form chlorine hydrate. A certain amount of the organic impurities, which are normally chlorinated compounds such as chloroform, carbon tetrachloride and hexachlorethane, is absorbed on the chlorine hydrate and falls to the bottom of the separating zone in this form. The remainder of the organic impurities is caused, in the preferred embodiment of the invention, to deposit on the walls of the separating zone and to flow downwardly towards the bottom of the zone. The dry and purified chlorine is removed overhead in excellent condition for liquefaction and storage in metal containers or for transportation in gaseous form by pipeline.

Chlorine gas formed in electrolytic cells at the temperature at which these cells operate will contain the amount of water vapor characteristic of the existing temperature and pressure conditions. Inasmuch as some cooling is inevitable when transporting the wet chlorine gas from the cells to a treating device, normally sufficient cooling to bring the temperature of the wet chlorine to the existing atmospheric conditions, the gas as received at the drying and purifying unit will contain entrained water as well as water vapor. In accordance with the invention this wet gas containing entrained water is preferably passed through a water knock-out zone in which the gas is passed in contact with the surface of a body of water and only thereafter is it contacted with liquid chlorine as above described.

In the preferred embodiment of the invention the liquid-gas mixture from the mixing zone is introduced tangentially into a cylindrical, or better, annular, enlarged zone. By proceeding in this way the components of the mixture are kept in close relation to one another for a time by centrifugal forces and liquid components such as organic impurities not absorbed on the chlorine hydrate are forced outwardly to the wall of the zone where they deposit and flow downwardly through the zone. This procedure, therefore, is effective to accomplish rapid and substantially complete separation of organic impurities and to assure that additional contact of the impure gas with chlorine hydrate particles is obtained.

Figure 2:
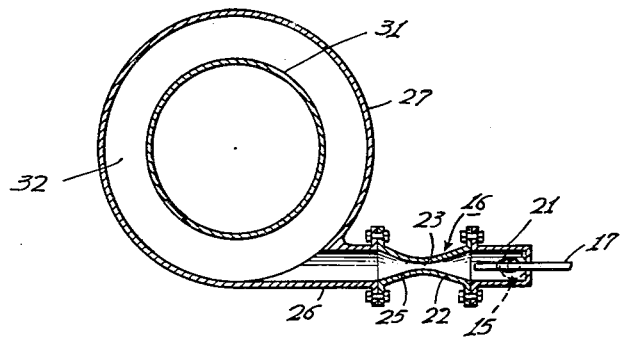

In order that the invention may be understood more fully, reference should be had to the attached drawing, which is hereby made a part of this specification, in which Figure 1 is a more or less diagrammatic view of a suitable system for carrying out the process of the invention; and Figure 2 is an enlarged cross-sectional view along the line II—II of Figure 1 looking in the direction of the arrows.

Referring to Figure 1, moist chlorine gas is introduced into the system through a line 10. This gas will contain the organic impurities formed in the electrolytic cell and normally the water content characteristic of the temperature of the electrolytic operation which may be about 180° F. Since the entering gas is preferably at a temperature in the neighborhood of room temperature, such as a temperature of 60° to 100° F., if the gas is passed directly from the electrolytic cells, it will contain in addition to water vapor a substantial quantity of entrained water. In instances where the gas from the cells has been chilled by a water spray, the entering gas may also contain some of the water used in the chilling operation. This gas is led through line 10 into a receiving vessel 11. The receiving vessel contains water up to the level shown, which level is controlled by means of a liquid level controller 12. The receiving vessel 11 is also provided with a baffle 13 which extends across the top of the vessel. The moist and impure chlorine gas from line 10 enters the receiving vessel in the space bounded by the baffle 13 and is caused to flow across the vessel in contact with the surface of the water. As a result, a substantial proportion, at least, of the entrained water is removed from the gas.

The gas is removed from the receiving vessel through a line 15 and is continuously introduced into a mixer 16. There is also continuously introduced into the mixer a stream of liquid chlorine through line 17, the rate of flow of the liquid chlorine being controlled by means of a valve 18, the operation of which is varied in accordance with changes in the temperature of the dry chlorine gas flowing in line 19, by means of the temperature control device indicated generally at 20.

The structure of the mixer will be understood more fully by reference to Figure 2. As shown there, it consists of a supporting section 21, an expanded entrance portion 22, and a venturi section comprising a narrow throat 23 and an expanded exit portion 25. In the mixer the liquid chlorine and the moist chlorine gas are rapidly and intimately mixed in flowing through the entrance portion and the throat of the mixer. As a result, a substantially homogeneous liquid-gas mixture is produced and substantially all parts of the gas are intimately contacted with liquid chlorine. The mixture is then expanded through the exit portion of the mixer and flows through pipe 26 into separating vessel 27. The separating vessel 27 is generally cylindrical and has a conical bottom portion 28 and an exit conduit 29. Also, in the modification shown, the separating vessel 27 is provided with an inner cylindrical member 31 which functions with the walls of vessel 27 to define an annular separating space 32. While the process is operative when using a separating vessel in which an inner cylinder such as cylinder 31 is omitted, the use of this cylinder is advantageous in insuring intimate contact of the components.

After the homogeneous mixture of liquid chlorine and moist chlorine gas passes through throat 23 and exit portion 25 of mixer 16, the liquid chlorine is rapidly vaporized to cause cooling of the mixture to a temperature of about —20° F. or below. This sudden drop in temperature causes the conversion of the water present in the mixture to ice and the formation of solid chlorine hydrate in which is absorbed at least a portion of the organic impurities. The mixture rapidly flows through pipe 26 and enters separating vessel 27, which is maintained at a low pressure, for example, a pressure slightly above atmospheric pressure. In this vessel it flows initially in an annular path. As a result, the organic impurities are caused to move outwardly from the mixture and contact the walls of vessel 27. Once these liquid impurities are in contact with the wall, they will flow downwardly out of the vessel. While the ice particles and chlorine hydrate particles are kept suspended for a time, during which period the chlorine hydrate can absorb additional organic impurities, eventually they fall downwardly to the bottom of vessel 27. The desired chlorine gas substantially dry and substantially free of organic impurities is removed overhead through line 19. This gas will be at a low temperature selected so as to produce a gas having the desired low water vapor content.

As stated previously, any variation in the temperature of the gas flowing in this line from the selected temperature will be compensated for by introducing more or less liquid chlorine into the system by operation of valve 18. The pure dried chlorine flowing in line 19 is passed to storage and to liquefaction or pipeline distribution. The ice, chlorine hydrate, and liquid organic impurities collect in the bottom of vessel 27 and are removed therefrom by conduit 29 leading to the bottom of receiving vessel 11. In order to melt any ice or chlorine hydrate collecting in the bottom of conical portion 28, water at about room temperature, for example a temperature of about 60° F., is sprayed into the bottom of this conical portion by means of a spray nozzle 33.

The water and dissolved or occluded impurities are removed from the bottom of vessel 11 through a line 35 leading to a pump 37 which operates to cause the water to flow through a line 38. A portion of the water flowing in line 38 enters line 39 provided with a valve 41 which is controlled by a temperature control device indicated generally at 41, and is sprayed through spray nozzle 33. The remainder of the water is removed from the system through line 42. The flow through line 42 is controlled by means of a valve 43 whose operation is adjusted by liquid level controller 12 so as to remove from the system an amount of water adapted to maintain the desired level in receiving vessel 11.

In an example of the operation of the process in a unit as shown in the drawing, 1000 pounds per hour of chlorine gas containing, for each 1000 pounds of chlorine 23.7 pounds of water vapor and additional entrained water, are introduced at a temperature of about 110° F. through line 10 into receiving vessel 11 where the entrained water is removed. The chlorine and the water vapor flow from this vessel through line 15 at a temperature of about 110° F. and a pressure of about 0.2 pound per square inch gage and enter mixer 16. About 470 pounds per hour of liquid chlorine at a temperature of about 60° F. and a pressure of about 75 pounds per square inch gage are introduced through line 17. The chlorine gas and the liquid chlorine are mixed intimately in the entrance portion of mixer 16 and expanded through the throat and exit portion of the mixer so that the liquid chlorine vaporizes and causes a drop in temperature to about —20° F., with the results previously described. Purified chlorine gas at a temperature of about —20° F. and a pressure of about 0.2 pound per square inch is taken overhead through line 19 from separator 27 at the rate of about 1470 pounds per hour.

It will be seen from the foregoing description that the present invention provides an efficient and economical process for the drying and purifying of wet and impure chlorine gas. The temperature to which the mixture of liquid chlorine and chlorine gas is cooled will depend primarily upon the relative amounts of liquid chlorine and chlorine gas combined in the mixer. For most purposes it is unnecessary to cool below —20° F. as the amount of water present with the gas produced at this temperature is not sufficient to make the gas corrosive to mild carbon steel. Accordingly, the gas after liquefaction will not corrode the usual metal containers employed for storing liquid chlorine, nor will it cause corrosion in pipelines used for transporting chlorine gas. It will be understood, however, that amounts of liquid chlorine producing higher and lower temperatures can be employed depending upon the use to which the chlorine is to be put.

Obviously many modifications and variations of the invention, as hereinbefore set forth, may be made without departing from the spirit or scope thereof and therefore only such limitations should be imposed as are indicated in the appended claims.

I claim:

1. A process of drying and purifying moist chlorine gas which comprises continuously and separately introducing a stream of moist chlorine gas and a stream of liquid chlorine into the enlarged entrance zone of a mixing zone having a substantially narrower intermediate zone and an enlarged exit zone, to intimately admix said moist chlorine gas and said liquid chlorine and form a substantially homogeneous liquid-gas mixture, then flowing said mixture through said intermediate zone, expanding said mixture in said enlarged exit zone to cool the mixture to a temperature at which chlorine hydrate and ice are formed, flowing the resulting mixture into a separating zone, and removing the resulting dry chlorine gas at a point substantially higher than the point at which said resulting mixture is flowed into said separating zone.

2. A process of drying and purifying moist chlorine gas which comprises continuously and separately introducing a stream of moist chlorine gas and a stream of liquid chlorine into the enlarged entrance zone of a mixing zone having a substantially narrower intermediate zone and an enlarged exit zone, to intimately admix said moist chlorine gas and said liquid chlorine and form a substantially homogeneous liquid-gas mixture, then flowing said mixture through said intermediate zone, expanding said mixture in said enlarged exit zone to cool the mixture to a low temperature of at least —20° F. at which chlorine hydrate and ice are formed, flowing the resulting mixture tangentially into a separating zone, causing said last-mentioned mixture to move in an annular path in said separating zone, and removing the resulting dry chlorine gas at a point substantially higher than the point at which said resulting mixture is flowed into said separating zone.

3. A process of drying and purifying moist chlorine gas which comprises continuously and separately introducing a stream of moist chlorine gas and a stream of liquid chlorine into the enlarged entrance zone of a mixing zone having a substantially narrower intermediate zone and an enlarged exit zone, to intimately admix said moist chlorine gas and said liquid chlorine to form a substantially homogeneous liquid-gas mixture, then flowing said mixture through said intermediate zone, expanding said mixture in said enlarged exit zone to cool the mixture to a low temperature of at least —20° F. at which chlorine hydrate and ice are formed, flowing the resulting mixture tangentially into an annular separating zone, causing said last-mentioned mixture to move in an annular path in said separating zone, and removing the resulting dry chlorine gas at a point substantially higher than the point at which said resulting mixture is flowed into said separating zone.

4. A process of drying and purifying moist chlorine gas containing entrained water in addition to water vapor which comprises passing said moist chlorine gas in contact with the surface of a body of water in a closed zone to remove entrained water, continuously and separately introducing a stream of the resulting chlorine gas containing water vapor but free of entrained water and a stream of liquid chlorine into the enlarged entrance zone of a mixing zone having a substantially narrower intermediate zone and an enlarged exit zone, to intimately admix said chlorine gas and said liquid chlorine to form a substantially homogeneous liquid-gas mixture, then flowing said mixture through said intermediate zone, expanding said mixture in said enlarged exit zone to cool the mixture to a low temperature of at least —20° F. at which chlorine hydrate and ice are formed, flowing the resulting mixture tangentially into a separating zone, causing said last-mentioned mixture to move in an annular path in said separating zone, and removing the resulting dry chlorine gas at a point substantially higher than the point at which said resulting mixture is flowed into said separating zone.

References Cited in the file of this patent

UNITED STATES PATENTS

| Number | Name | Date |
|---|---|---|
| 2,077,310 | Cushing | Apr. 13, 1937 |
| 2,199,797 | Hunter | May 7, 1940 |
| 2,209,339 | Knight | July 30, 1940 |
| 2,214,658 | Browning | Sept. 10, 1940 |
| 2,259,919 | Bacon | Oct. 21, 1941 |
| 2,271,634 | Fletcher et al. | Feb. 3, 1942 |
| 2,278,750 | Walker | Apr. 7, 1942 |
| 2,318,512 | McHaffie | May 6, 1943 |
| 2,553,557 | Dunning | May 22, 1951 |
| 2,604,185 | Johnston et al. | July 22, 1952 |
| 2,607,438 | Bailey | Aug. 19, 1952 |